United States Patent [19]

West

[11] 4,270,403
[45] Jun. 2, 1981

[54] PUSH-PULL CABLE MOTOR TRUCK REMOTE GEAR SHIFT SYSTEM AND TWO-DIMENSIONAL MOTION CONVERSION AND TRANSMISSION APPARATUS THEREIN

[75] Inventor: Harold H. West, Seattle, Wash.

[73] Assignee: Cablecraft, Inc., Tacoma, Wash.

[21] Appl. No.: 14,842

[22] Filed: Feb. 26, 1979

[51] Int. Cl.³ .......................... G05G 9/16; F16C 1/12
[52] U.S. Cl. ................................ 74/473 R; 74/501 R
[58] Field of Search ............. 74/473 R, 501 R, 501 M

[56] References Cited

U.S. PATENT DOCUMENTS

| | | | |
|---|---|---|---|
| 1,630,076 | 5/1927 | Schmidt | 74/501 R X |
| 3,186,251 | 6/1965 | Quarfoot | 74/501 R |
| 4,152,950 | 5/1979 | Langford | 74/501 R X |

Primary Examiner—Allan D. Herrmann
Attorney, Agent, or Firm—Christensen, O'Connor, Johnson & Kindness

[57] ABSTRACT

Through dual push-pull cables, two-dimensional positioning motions and accompanying forces of an actuator device, such as a motor truck gear shift lever, are transmitted to a remote actuated device, such as the gear selector and shifter mechanism in the truck transmission. Interconnected by the cables, matched motion translators in master and slave units are rotationally and translationally guided in their respective units so as to transform two-dimensionally defined actuator motion applied to the master unit into motion components for transmission by the dual connecting cables to the slave unit, where the lineal cable motions are transformed back into a duplication of the actuator motion with accompanying forces effective to selectively operate the actuated device connected to the slave unit translator member.

11 Claims, 7 Drawing Figures

MOTION CONSTRAINT PATH PATTERN IMPOSED BY TRANSMISSION 12 SELECTOR/SHIFTER MECHANISM

EFFECTIVE MOTION CONSTRAINT PATH PATTERN IMPOSED BY TRANSMISSION 12 SELECTOR/SHIFTER MECHANISM

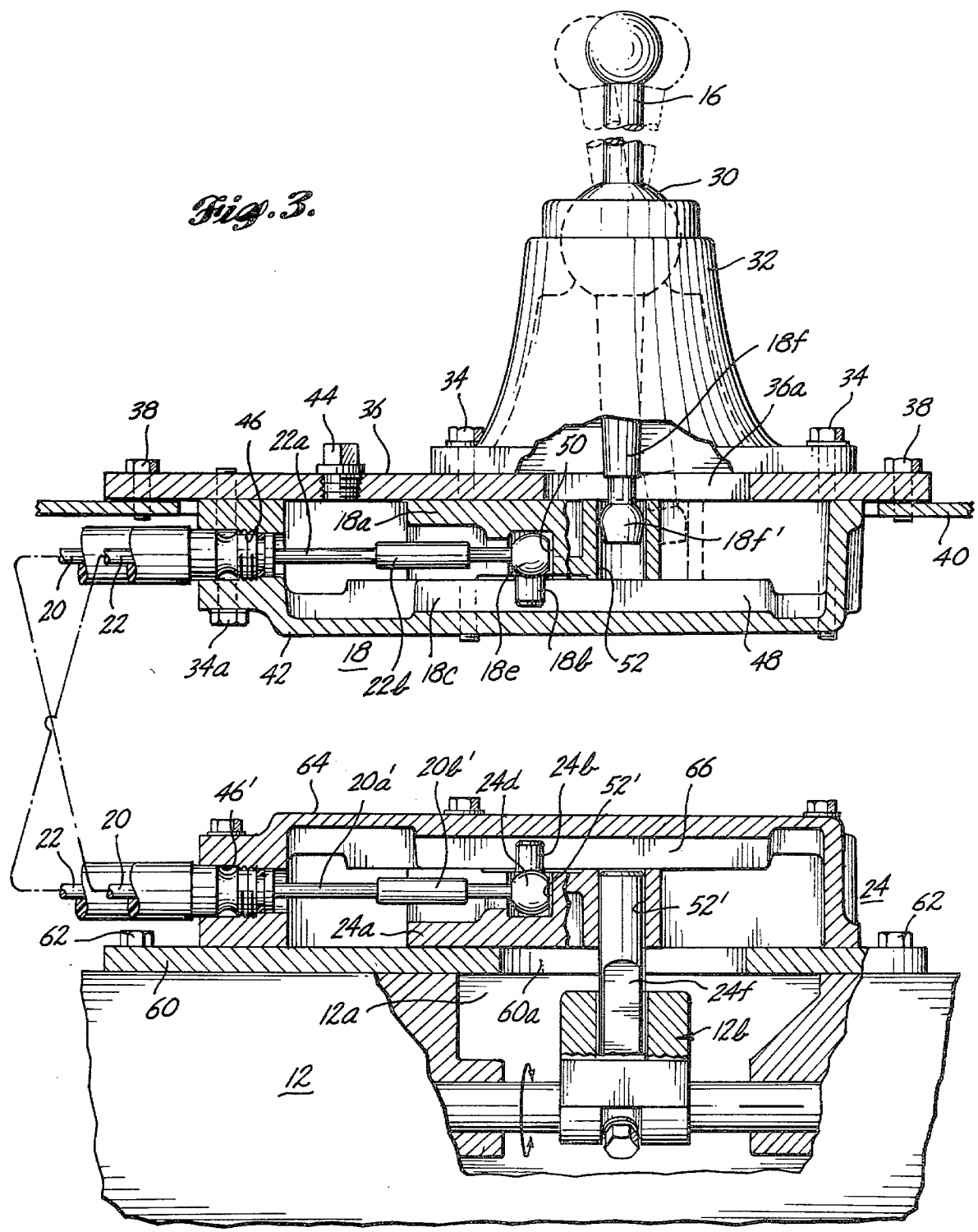

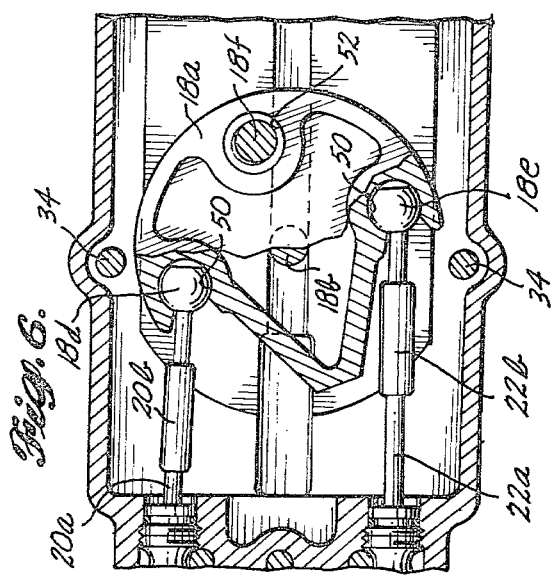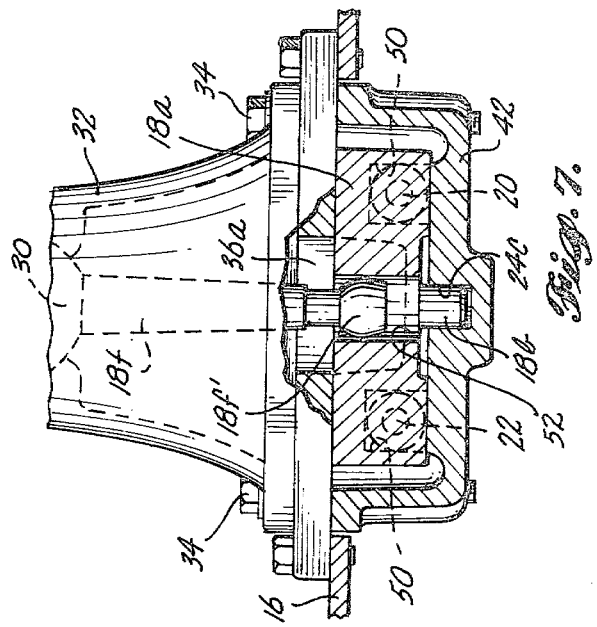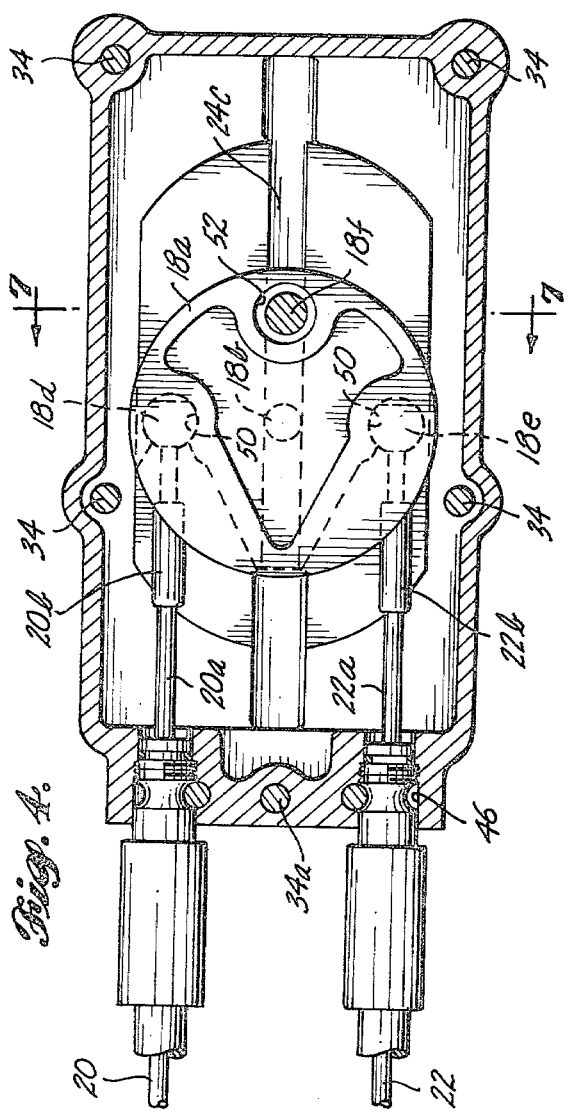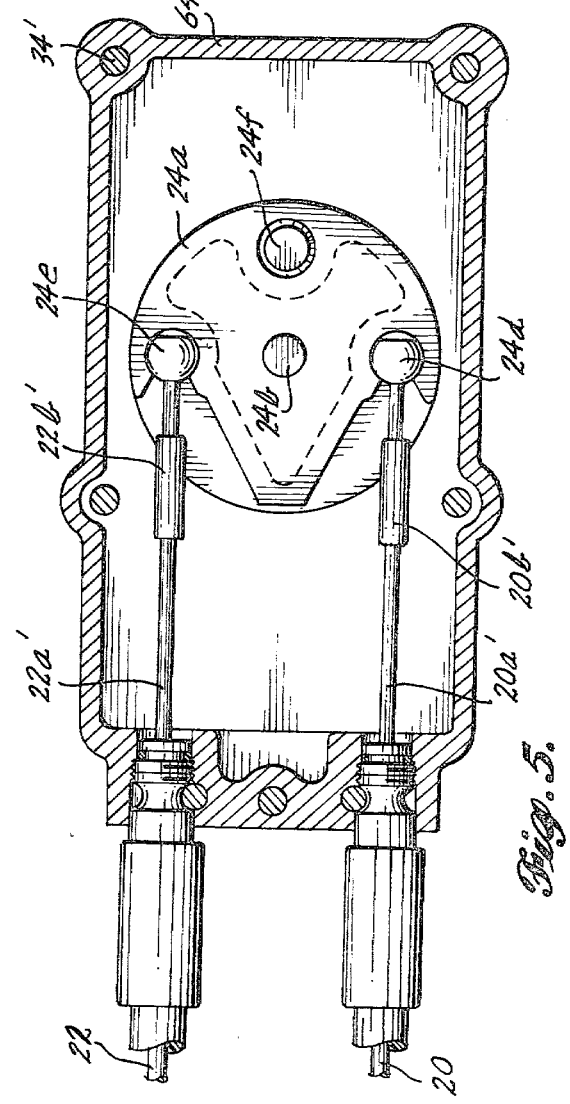

PUSH-PULL CABLE MOTOR TRUCK REMOTE GEAR SHIFT SYSTEM AND TWO-DIMENSIONAL MOTION CONVERSION AND TRANSMISSION APPARATUS THEREIN

BACKGROUND OF THE INVENTION

This invention relates to push-pull cable remote actuator apparatus, and more particularly to an improved motor truck remote gear shift system including novel apparatus operable to convert and transmit the two-dimensionally defined actuator (gear shift lever) motions, into components transmittable by the two cable, and upon such transmission to reconvert the transmitted components into a duplication of the actuator motions for remote selective actuation of the gear selector/shifter mechanism in a motor truck drive transmission. The invention is herein illustratively described by reference to the presently preferred embodiment thereof so applied; however, it will be recognized that certain modifications and changes therein with respect to details may be made and that other applications of the invention apparatus are contemplated without departing from the essential features involved.

In a cab-over motor truck in which the cab hinges upwardly and forwardly so as to provide access to the underlying engine and transmission, an elongated articulated or flexible operating connection is required between the chassis-mounted drive gear transmission unit and the gear shift lever or actuator situated in the cab of the truck. Such connecting mechanisms heretofore provided have generally employed rigid links or shafts and thus have been relatively bulky and expensive. The relatively low cost, compactness and flexibility of push-pull cables serving as remote control couplers suits them for this assignment. However, since the motions to be transmitted are complex (i.e., defined two-dimensionally), the cables flexible and resilient, and the forces substantial, an improperly designed cable system can be objectionable in its indefinite remote positioning effect and in its springy or mushy feel sensation afforded to the operator through the gear shift lever actuator. Accordingly, a broad object of the present invention is to provide a new and improved push-pull cable remote actuator mechanism overcoming such limitations and objections. A related object is to devise such a dual push-pull cable remote actuation apparatus incorporating motion-converting master and slave units of relatively simple and compact form easily installed in new and existing trucks and for other applications.

Still another object of this invention is to provide remote actuation apparatus having the aforementioned advantages and incorporating master and slave units which are readily fully lubricated and which incorporate motion translator members designed for ease of operation through all motion sequences and subject to minimal wear and frictional restraint, thereby assuring operating effectiveness, reliability and long operating life.

A further object hereof is to provide a push-pull cable remote actuation system in which the master and slave unit translator members interconnected by dual push-pull cables provide both positive control and a feel sensation of definite positional control of the actuated mechanism, e.g. the gear selector and shifting mechanism of the remote transmission unit.

BRIEF DESCRIPTION OF THE INVENTION

In accordance with this invention, two-dimensionally defined actuator motions are converted by a master unit for transmission by dual push-pull cables and are reconverted by a slave unit interconnected by the dual cables with the master unit for actuating a load device, such as a motor vehicle transmission gear selector/shifter, through motions duplicating the original actuator motions. To effect such motion conversion and reconversion, the master and slave units each have a translator member rotationally mounted therein and movable in bodily translation along a defined lineal path (preferably straight but alternatively curvilinear) in the plane of rotation. The cable connections to each translator member are transversely spaced, with the cables mounted so as to direct the push-pull force lines thereof generally parallel with the lineal path of motion of the associated translator member. Thus, differential actuation of the cables is accompanied by angular motion of the translator members in a related direction whereas conjoint equal actuation of the cables in either direction is attended by corresponding bodily translational motion of the translator members.

At the master unit, the actuator means may, for example, comprise a motor truck gear shift lever movable in conventional patterns both transversely and lengthwise of the vehicle. Although it is the truck driver that causes the motions, it is the remote transmission mechanism that defines the lines of movement available in executing the motion pattern selected by the driver. Viewed broadly, however, either the input actuator or the output actuated device may be mechanically guided or constrained to a defined complex pattern of motion. In still other cases, neither the master unit actuator nor the slave unit output or actuated device will be subjected to directional motion guidance or constraint, so that the operator alone determines the pattern of motions.

These and other features, objects and advantages of the invention will become more fully evident from the description that follows with reference to the accompanying drawings.

DESCRIPTION OF THE DRAWINGS

FIG. 3 is a composite assembly drawing of the master and slave units with parts broken away.

FIG. 4 is a top view of the master unit shown partly in section and with its cover removed to illustrate the master unit translator member in the neutral position; and FIG. 5 is a similar view of the slave unit with its translator member in a translational position offset from neutral.

FIG. 6 is a partial view similar to FIG. 4 illustrating the master unit translator member shifted in translation to one extreme position and angularly upon attaining one of the alternatively available operating positions in selecting and shifting the transmission unit gearing connected to the slave unit.

FIG. 7 is a sectional end view with parts broken away taken on line 7—7 in FIG. 4, illustrating the master unit translator member and the actuator element (gear shift lever) coupled to such translator member.

DETAILED DESCRIPTION REFERRING TO DRAWINGS

Figure 1:
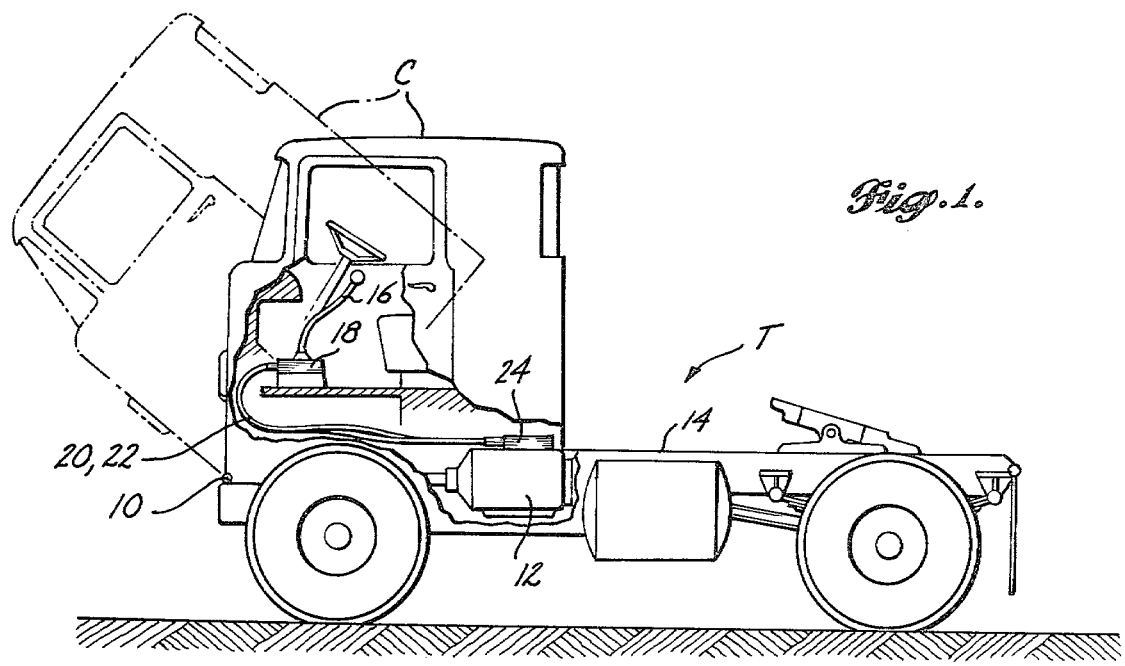
FIG. 1 is a simplified side elevation view of a cab-over truck in which a system of the invention is incorporated.

In the drawings the preferred embodiment of the invention is shown in a remote drive gear actuator system for a cab-over motor truck T in which the truck cab C is hinged at 10 to swing upwardly and forwardly in the conventional manner so as to afford access to the underlying truck engine (not shown) and gear drive transmission 12 mounted on the truck chassis 14. In the truck cab C a gear shift lever 16 projects upwardly in conventional position from a pedestal-mounted master unit 18 in the cab, which unit is operatively connected by push-pull cables 20 and 22 to a remote slave unit 24 mounted on top of the drive gear transmission 12 for selectively operating the gear shift mechanism in such transmission.

Figure 2:
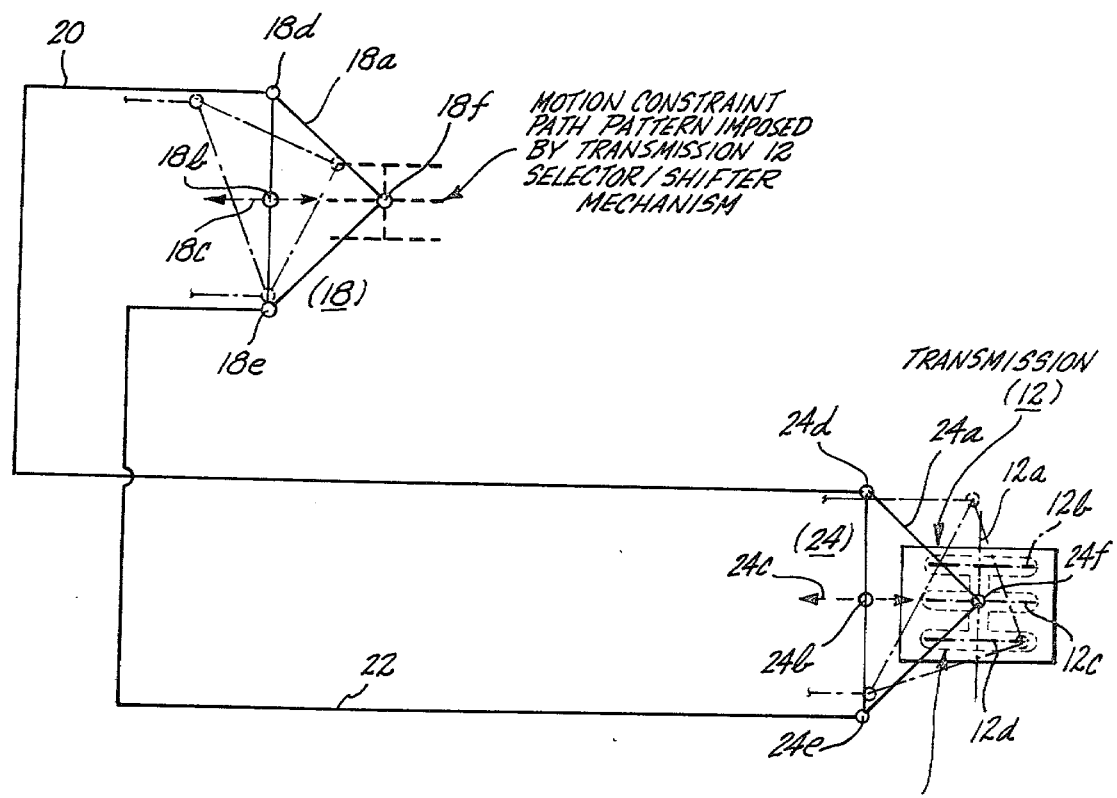
FIG. 2 is a schematic diagram illustrating the motion converting, transmitting and reconverting principles utilized in the invention.

Reduced to fundamentals in the schematic illustration of FIG. 2 for purposes of explaining the motion conversion, transmitting and reconversion functions of the apparatus, the master unit motion translator is symbolically represented as a solid triangular member 18a one leg of which is pivoted on an element 18b to permit angular motion of the member 18a, which element, and with it the member 18a, is slidable in bodily translation along a fixed, defined lineal path 18c, in this case a straight longitudinal path. Push-pull cables 20 and 22 have ends respectively connected to the adjacent ends of the member 18a at points 18d and 18e. An actuator for the translator member 18a is represented at 18f at the apex of the triangle and is movable in the general body plane of member 18a in directions effective to rotate the translator member about its sliding pivot 18b and to move the translator member in bodily translation along the lineal path 18c. The projecting end portions of push-pull cables 20 and 22 thus connected to the translator member 18a are disposed in generally parallel relationship and generally in the body plane of motion of the translator member 18a, with the connecting points on member 18a spaced on opposite sides of pivot 18b and generally in a transverse line through such pivot, such that relative longitudinal motion of the cables is effected by pure angular motion of member 18a, whereas conjoint longitudinal motion of the cables is effected by pure translational motion of member 18a along translational motion path 18c.

At the opposite ends of the cables 20 and 22 the slave unit translator member is similarly depicted as a rigid triangle member 24a having a sliding pivot 24b movable along a fixed lineal translation path 24c, with the pivot 24b located intermediate the respective cable connecting points 24d and 24e at the opposite ends of the base side of the member triangle as in the case of the master unit. In this case, however, the slave unit has an output or actuated member coupling 18f coupled to the gear selector/shifter mechanism (not shown) of transmission 12 and mounted at the apex of the translator member triangle 24a. So coupled, the element 18f is physically guided or constrained by the conventional design characteristics of the illustrative gear shifter mechanism of the standard transmission 12 so as to be movable only along a transverse gear rail selector path 12a and along any of the intersecting longitudinal branch paths 12b, 12c or 12d bifuracted by the central path 12a and representing the three individual gear rails in the transmission. In the neutral position of the system, with no transmission drive gears engaged, the coupling element 18f lies at the intersecton of transverse path 12a and the middle branch path 12c as shown. The path system of transmitter coupler motion resembles a double "H" pattern as shown schematically in the diagram.

The differential action of the cables in the translator rotation mode and their conjoint unidirectional action in the translator lineal motion mode provides the desired tight coupling and positive remote positioning control throughout the full operating range of positions transmitted.

In the truck cab, the transmission gear shift lever 16 has a lower end portion 18f that serves as the master unit actuator. Intermediate its ends, the gear shift lever has a universal ball mount 30 permitting its angular motion in any direction relative to its support pedestal 32. The pedestal supports the ball in seals (not shown) and in turn is mounted by bolts 34 on the master unit cover plate 36. The latter in turn is mounted by bolts 38 threaded in the truck floor 40 around the rim of an open aperture that accommodates the master unit 18 supported by the base plate 36 at and just below the floor level. One or more additional bolts 34a cooperating with bolts 34 secure the master unit housing 42 to the underside of cover plate 36. The hollow interior of the master unit housing 42 is sealed by suitable means (not shown) to the underside of the cover plate 36 and communicates with the overlying interior of the pedestal/-housing 32 through an opening 36a in the cover plate 36. The size and dimensions of the latter provide room to accommodate the full range of motion of the actuator end (18f) of the gear shift lever 16 as shown extending through the opening 36a. The joint between the base of pedestal 36 and the cover plate 36 is also sealed. The housing is filled with lubricant oil through an opening in cover plate 36 normally closed by removable plug 44. Seals of a conventional nature are also provided around the end fittings of push-pull cables 20 and 22 where they enter the housing 42 through transversely spaced parallel openings 46 in one end wall of such housing. The cable end fittings are pivotally connected to the translator number as shown.

Master unit translator member 18a is generally of round disk-like configuration. A central pivot pin or stub shaft 18b on its bottom is slidably and rotatively received in a longitudinally extending guide slot 48 formed in the generally flat bottom of housing 42. The slot extends longitudinally of the housing substantially parallel to the cable end portions entering the housing. As shown in FIG. 3, the inner or core member of cable 22 has a rod like extension 22a inside the master unit housing 42 that terminates in a fitting 22b having a coupler ball thereon. The ball fitting constitutes the pivotal connection 18e and is slidably received in a cylindrical socket 50 formed in the translator member 18a so as to be revolvable in the socket during angular motion of the translator member. A similar socket 52 diametrically opposed to the socket 50 in the translator member 18a receives the similar ball coupler fitting 18d on the extension rod 20a of push-pull cable 20, as shown (FIG. 4). Preferably the line of location of ball couplers 18d and 18e passes through the axis of the sliding pivot pin 18b, the direction of such alignment being perpendicular to the guide slot 24c when the translator member 18a is in the "neutral" position of the system.

Shifter lever 16 terminates at its actuator end 18f in a ball fitting 18f slidably received in an open bore 52 in the translator member 18a. The bore is located at a radial offset from the sliding pivot pin 18b in a direction perpendicular to the line of the two ball couplers 18d and 18e (FIG. 4) so that lateral shifting of the shifter lever ball 18f' exerts rotative torque on the translator member 18a to produce angular motion of the translator member about the pivot shaft 18b. Such angular motion of the translator member reduces the extended length of one push-pull cable while increasing that of the other within the master unit housing 42. On the other hand, shifting of the actuator ball 18f' longitudinally of the housing and of guide slot 24c produces conjoint extension or shortening of the projecting lengths of the push-pull cable end portions within the housing, depending upon the direction of shifting. Simultaneous lateral and longitudinal components of motion exerted by the actuator ball 18f' on the translator member 18a, of course, produce simultaneous rotative and longitudinal translation motion of the translator member 18a within the housing 42. Having parallel flat top and bottom faces, the translator member 18a is slidably received between the respective bottom face of cover plate 36 and top face of the housing bottom. As such, the disk-like translator member 18a moves in its rotary and translational motions in the general plane of the translational member. This motion plane may be considered the same as the plane defined by the parallel transversely spaced push-pull cable end portions including fittings 20a and 22a. The assembly is highly compact in that it may be flat and shallow, taking up very little vertical space at or beneath the truck floor level, and as such is adapted for mounting in existing vehicles as well as in new vehicles without necessity of redesigning of the vehicle structure itself. It is also readily adapted as shown to receive and be actuated by a standard manual gear shift lever 16 and support pedestal 32. The small cross sections and flexibility of the connecting cables makes their accommodation in extending between master and slave unit a comparatively easy matter in both new and retrofit installations.

The slave unit 24 is generally of a form similar to the master unit 18 although inverted for mounting directly on the top of the transmission unit 12. For this purpose, a mounting plate 60 is secured by bolts 62 and together with the housing 64 and suitable seals (not shown) forms a sealed replacement for the normal cover applied over the top opening 12a formed in the housing of a standard gear drive transmission 12. Cover plate 60 has an opening 60a in registry with the transmission top opening 12a so as to accommodate the output coupler 24f extending down into the transmission and so that transmission lubricating oil under pressure in the housing of the transmission will be forced or splashed upwardly into the interior of the slave unit 24 in order to lubricate the moving parts of the slave unit and thereby avoid the necessity for separate lubricating provisions for the slave unit. The output coupler shaft 24f engages the existing gear selector and shifting mechanism generally designated 12b in the transmission unit 12.

Without attempting to describe the details of the transmission mechanism itself, suffice it to say that predominantly rotary motion of the slave unit translator member 24a about its rotatable and translatively slidable pivot shaft 24b acts through the coupler shaft 24f to cause the shifter mechanism to select one of three parallel rails in the transmission 12 that extend parallel to the guide slot 66 formed in the top wall of the slave unit housing 64, whereas longitudinal translational movement of the translator member 24a along the guide slot 66 produces drive gear engagement of either of two gears in the transmission associated with opposite ends of the guide rail selected in the transmission. The gear selector and shifting mechanism within the conventional transmission is such so as to impose defined and constraining paths of motion on the coupler shaft 24f essentially requiring it to move in the double-H pattern depicted schematically in FIG. 2 as described previously herein.

As to further details of the slave unit 24, they are otherwise essentially the counterparts of the details of the master unit, inverted, and for convenience bear similar reference numerals primed, except as identified by reference numerals individual to certain components already described in connection with FIG. 2. Because of the inversion of the slave unit relative to the master unit in mounted position, with the push-pull cables entering and leaving the master and slave units from their forward ends, the cables are crossed over one another as depicted in FIGS. 2 and 3 in order that the selecting and shifting motions applied by the slave unit translator member to the transmission mechanism 12b will be in the same sense or phase as the control motions applied by the gear shift actuator in the truck cab.

Both master and slave units have few and simple parts that are readily assembled and disassembled by a way of installing and removing the top and bottom plate connecting bolts depicted.

Having thus described the invention by reference to its preferred novel embodiment and by application as a system and in its preferred embodiment as a novel complex motion converting, transmitting and reconverting apparatus, reference is now made to the claims that follow defining the new and useful subject matter of the invention.

The embodiments of the invention in which an exclusive property or privilege is claimed are defined as follows:

1. Motion conversion, transmitting and reconversion apparatus comprising a master unit and a remote slave unit each including a translator member guided therein for rotational motion about an axis and for lineally defined translational motion in a motion plane perpendicular to said axis, means to actuate the master unit translator member to execute such motions, motion transmitting means comprising a pair of flexible push-pull cables interconnecting said translator members at respective spaced locations on each for effecting rotational and translational motions of the slave unit translator member substantially duplicative of such motions of the master unit translator member, and output coupler means on the slave unit translator member.

2. The apparatus defined in claim 1, wherein at least one of the translator members is of generally disk-like configuration, and associated means guiding such one translator member comprising an enclosure with opposing parallel walls slidably receiving said one translator member therebetween.

3. The apparatus defined in claims 1 or 2 wherein the means guiding at least one of the translator members comprises an elongated lineal guideway and pivot means rotatively supporting the associated translator member for its angular movment and which, in turn, is movable lengthwise in relation to the guideway for guiding the translator member in its translational movement.

4. Push-pull cable remote actuation apparatus comprising spaced master and slave units each including a translator member and means guiding such translator member for angular motion in a motion plane and for bodily translational motion along a defined lineal path in said plane, first and second flexible push-pull cables extending between said units having respective end portions mounted in fixed association with each unit in transversely spaced generally parallel relationship with the associated translator member lineal motion path in such unit, such respective cable end portions at each unit being operatively connected to the associated translator member at transversely spaced locations thereon such that relative longitudinal movement of the cable end portions is attended at each unit by related angular motion of the translator member therein while conjoint equal longitudinal movement of the cable end portions in the same direction is attended by related bodily translational motion of such translator member along its lineal motion path, coupler means in the master unit translator member adapted for operative coupling to actuator means to be actuated in a two-dimensional actuation path pattern in the motion plane of said master unit translator member, whereby to effect master unit translator member angular and translational motions coupled by said cables to the slave unit translator member for producing similar angular and translational motions of the latter, and output coupler means on said slave unit translator operable thereby to move in a path corresponding to said two-dimensional actuation path pattern.

5. The apparatus defined in claim 4 further characterized in that the master and slave units comprise housings with lineal path guideways in the respective housings and wherein the associated translator members have angular motion pivot means slidable in translation along the respective guideways.

6. The apparatus defined in claim 5 wherein the translator members are of generally flat disk-like form and the housings comprise parallel opposing inner generally flat surfaces between which the translator members are received in slidable relationship.

7. The apparatus defined in claim 6 wherein the guideway in each housing comprises an elongated groove formed in associate with one of the flat surfaces thereof, and the sliding pivot means of the associated translator member comprises a pivot pin slidably received in such groove.

8. The apparatus defined in any of claims 5, 6 or 7 wherein the pivot means for each translator member is located generally midway between and in the line of the cable connecton locations of such translator member.

9. The apparatus defined in any of claims 5, 6 or 7 wherein the pivot means for each translator member is located generally midway between and in the line of the cable connection locations of such translator member, wherein the actuator means is operatively connected to the master unit translator member at a location along a straight line substantially perpendicular to a straight line extending through the cable connection locations of such translator member, and wherein the output coupler means is located on the slave unit translator member at a location along a straight line substantially perpendicular to a straight line extending through the cable connection locations of such translator member.

10. The apparatus defined in any of claims 4, 5, 6 or 7 and means operatively associated with one of said actuator means and output coupler means constraining the motion path thereof in a two-dimensionally defined pattern.

11. The apparatus defined in any of claims 4, 5, 6 or 7 and vehicle gear drive transmission means having gear selector and shifter mechanism to which the output coupler means is connected and which is operable to constrain the motion path of said coupler means and thereby of said actuator means to a predetermined two-dimensionally defined path pattern, and actuator means comprising an operator-movable member operable through said apparatus to move the output coupler means selectively along said path pattern.

* * * * *